United States Patent [19]

Annis, Jr.

[11] 4,378,262
[45] Mar. 29, 1983

[54] METHOD AND APPARATUS FOR FORMING AND TENSIONING A STRAP LOOP ABOUT A PACKAGE

[75] Inventor: James R. Annis, Jr., Palatine, Ill.

[73] Assignee: Signode Corporation, Glenview, Ill.

[21] Appl. No.: 360,764

[22] Filed: Mar. 22, 1982

Related U.S. Application Data

[63] Continuation-in-part of Ser. No. 231,281, Feb. 4, 1981, abandoned.

[51] Int. Cl.³ ..................... B29C 27/08; B65B 13/02
[52] U.S. Cl. ................................. 156/73.5; 53/399; 53/582; 100/2; 100/4; 100/29; 100/33 R; 100/33 PB; 156/212; 156/495; 156/580
[58] Field of Search ............... 156/73.5, 212, 267, 156/468, 495, 543, 580; 53/399, 582, 588; 100/2, 4, 29, 27, 33 R, 33 PB

[56] References Cited

U.S. PATENT DOCUMENTS

| | | | |
|---|---|---|---|
| 3,442,732 | 5/1969 | Stensaker et al. | 100/29 |
| 3,494,280 | 2/1970 | Kobiella | 100/2 |
| 3,554,844 | 1/1971 | Ingram | 156/522 |
| 4,062,278 | 12/1977 | Cheung | 53/582 |
| 4,077,313 | 3/1978 | Lems et al. | 100/2 |
| 4,079,667 | 3/1978 | Lems et al. | 100/2 |

FOREIGN PATENT DOCUMENTS 1153318 8/1963 Fed. Rep. of Germany.
2403261 7/1975 Fed. Rep. of Germany.

Primary Examiner—Michael G. Wityshyn
Attorney, Agent, or Firm—Dressler, Goldsmith, Shore, Sutker & Milnamow, Ltd.

[57] ABSTRACT

A method and apparatus are provided for forming a strap loop and securing it about an article. The strap free end is pressed against a guide surface and moved in a path to form a primary strap loop while permitting the primary strap loop to twist off of the guide surface. With the free end of the strap held against further movement, the trailing portion of the strap is fed to expand the loop to a predetermined larger size. The article is inserted in the loop and the trailing portion of the strap is withdrawn to tighten the loop about the package. The trailing portion of the strap is severed from the tightened strap loop and the overlapping portions of the strap are sealed by a friction-fusion weld.

18 Claims, 30 Drawing Figures

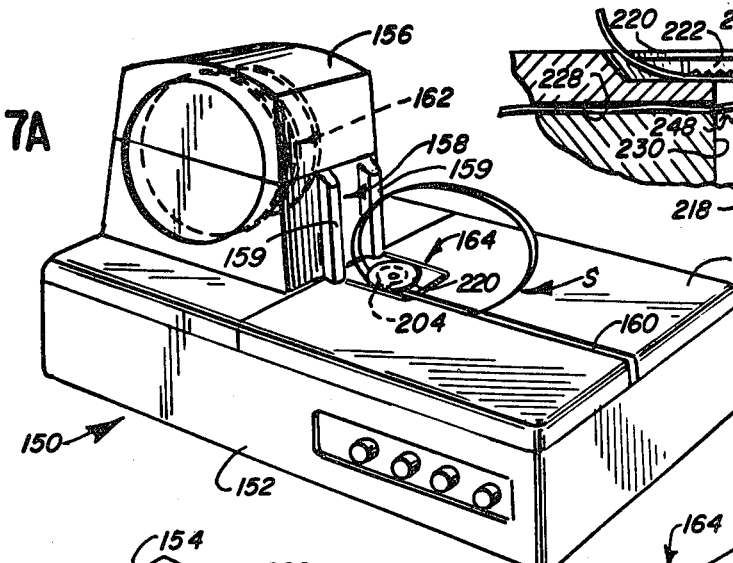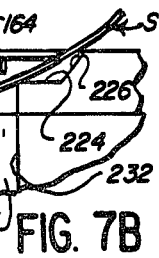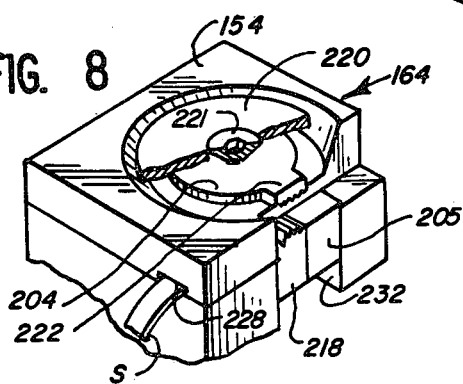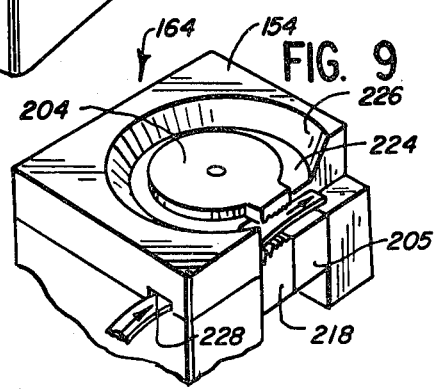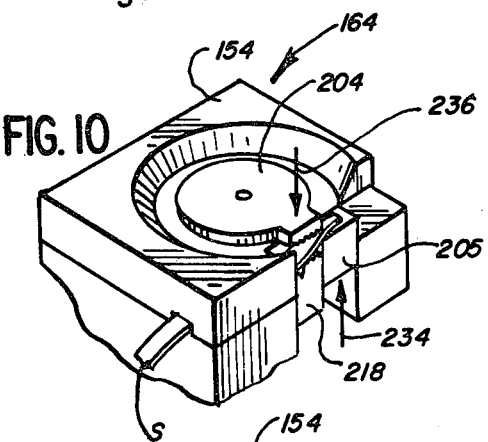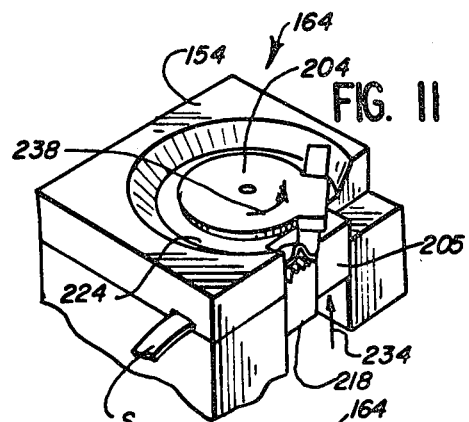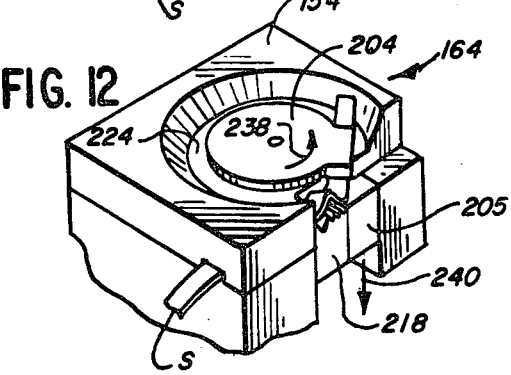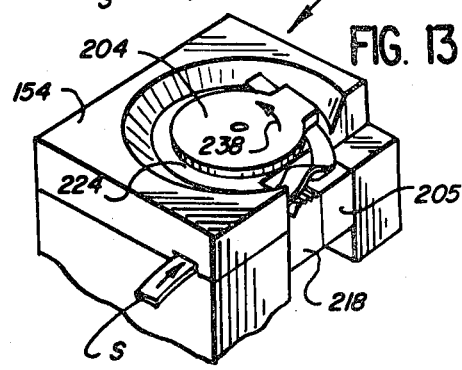

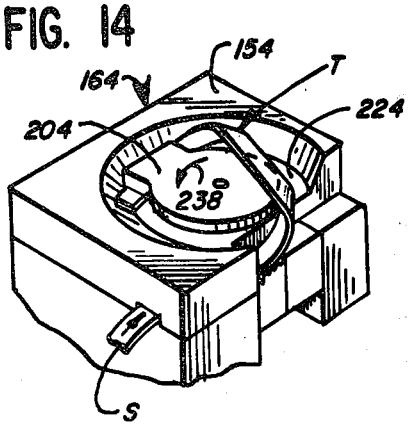
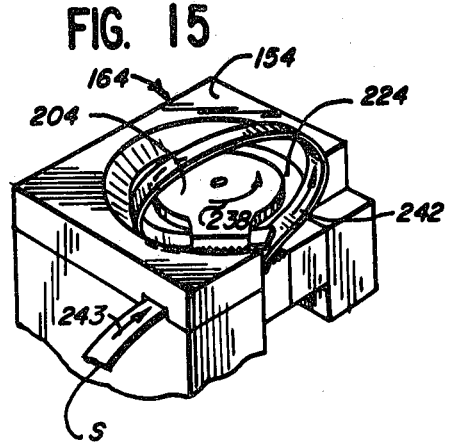
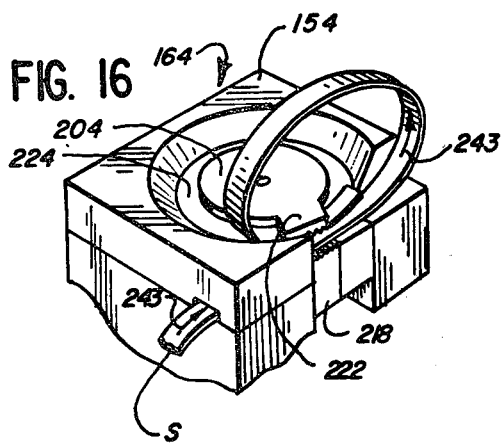
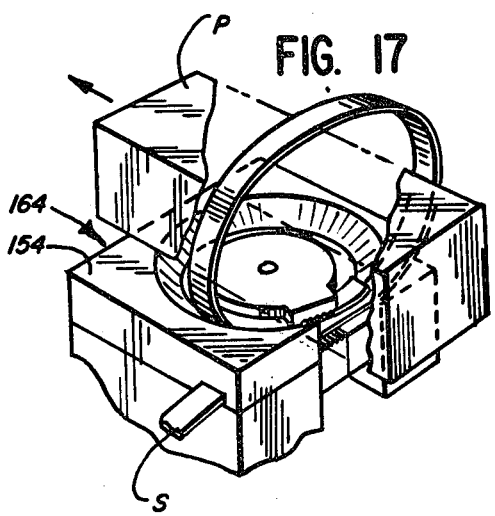
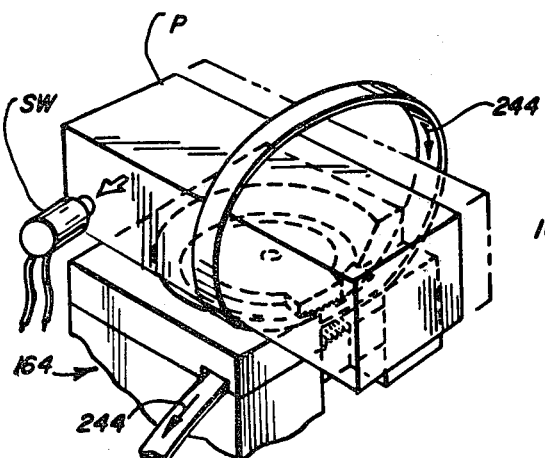
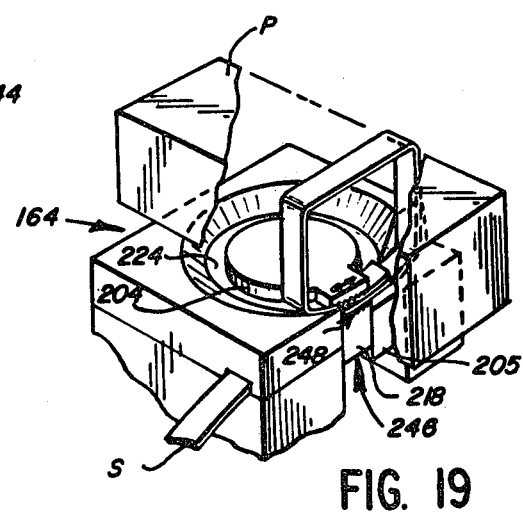

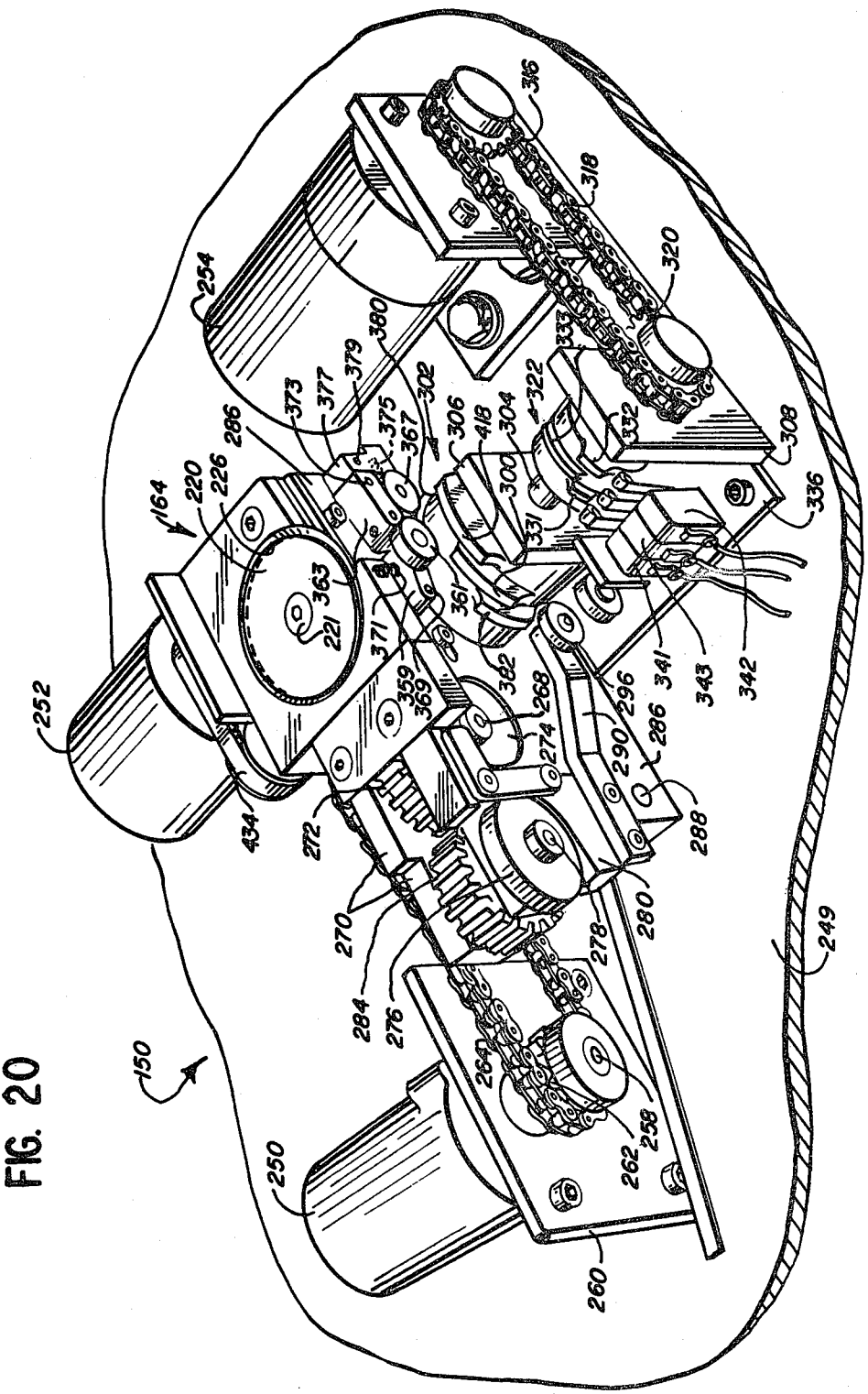

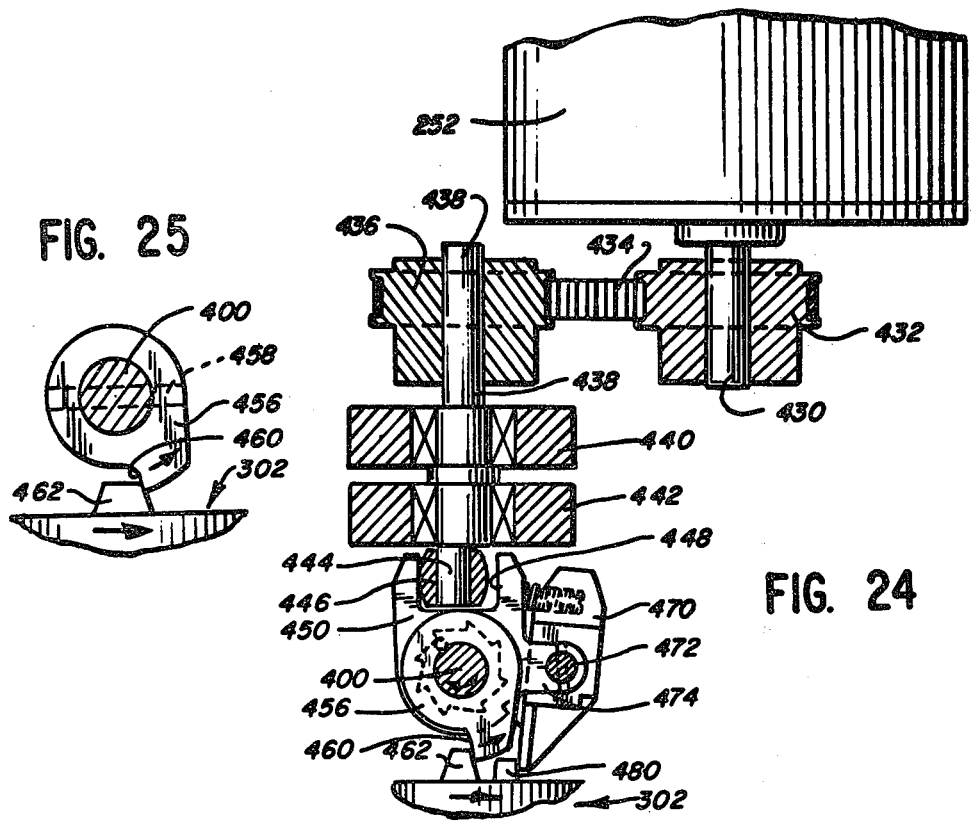
FIG. 25
FIG. 24
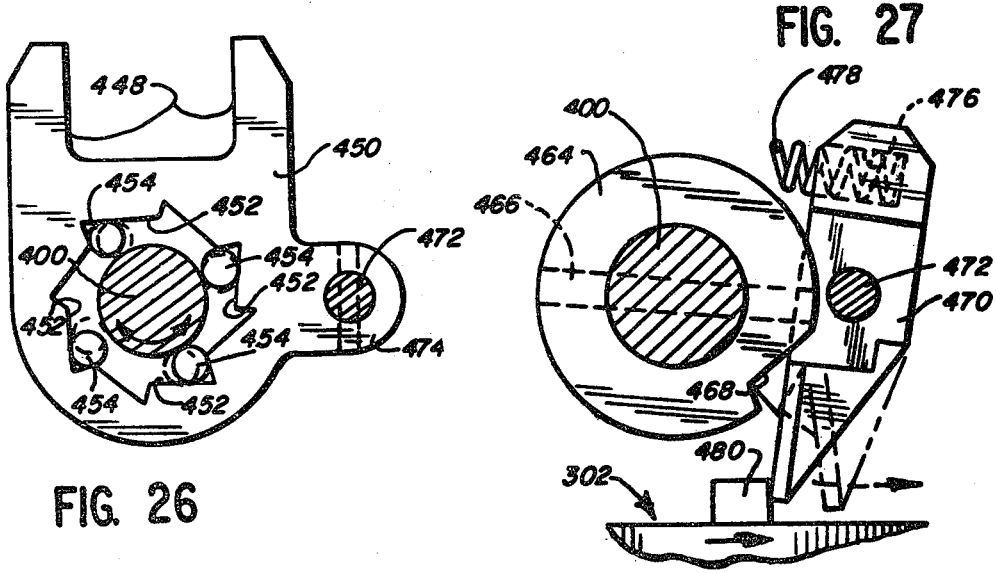
FIG. 27
FIG. 26

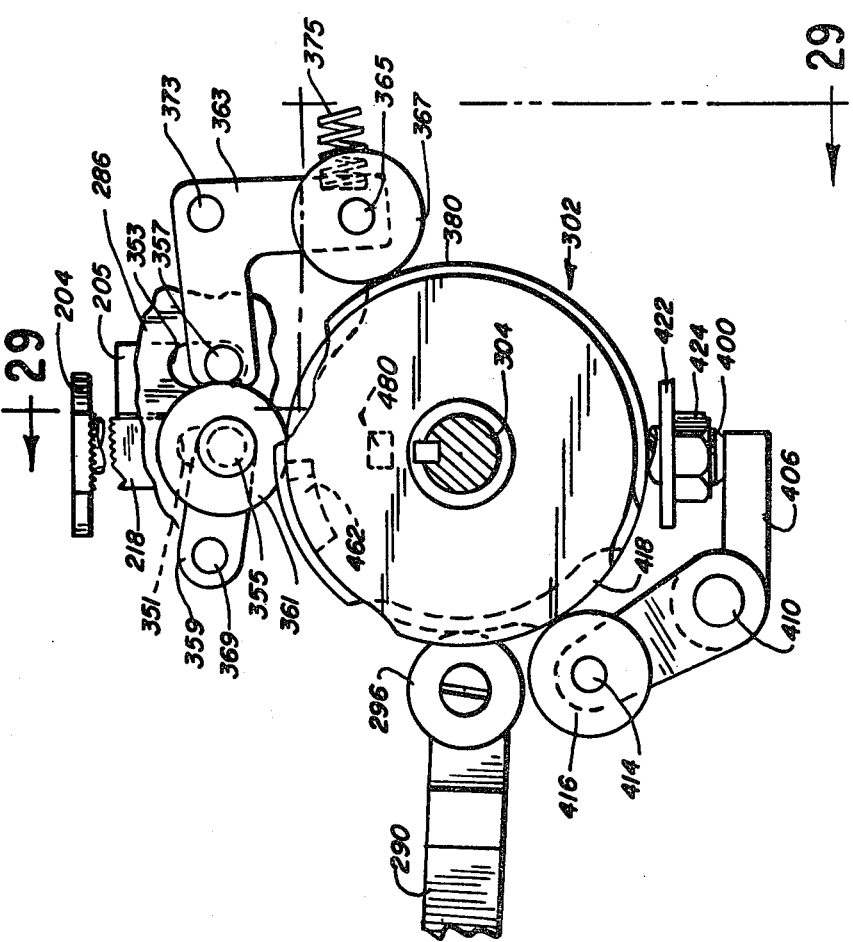

METHOD AND APPARATUS FOR FORMING AND TENSIONING A STRAP LOOP ABOUT A PACKAGE

This is a continuation-in-part of application Ser. No. 231,281, filed Feb. 4, 1981, now abandoned.

TECHNICAL FIELD

This invention relates to the formation of a loop of flexible binding or strapping material and to the subsequent securement of the loop about a package, article or other object.

BACKGROUND OF THE INVENTION

Typical machines for binding a package with a loop of flexible strapping material are described in the U.S. Pat. Nos. 1,357,883; 3,146,694; 3,215,064; 3,636,861; 3,691,939; 3,875,855; 3,916,779; and 3,946,659. These types of machines incorporate strap guide structures of various kinds to guide the strap in a loop around the package to be bound.

Disclosures have been made of machines which first form a small loop in a certain manner and which then enlarge the loop to fit around the package to be bound. In the past, Signode Corporation, the assignee of the entire interest of the present invention, has developed several processes and machines for forming a strap loop about a package, tensioning the loop, and finally joining the overlapping portions of the tensioned loop.

Some of these processes and machines, such as those disclosed in the U.S. Pat. Nos. 4,062,278, 4,077,313, and 4,079,667, involve the initial formation of a small, primary strap loop in or around a circular guide and then the subsequent expansion of the primary loop to a larger diameter for fitting around the package. The process is then completed by tensioning the loop about the package, joining the overlapping strap portions, and severing the secured loop from the trailing portion of the strap.

SUMMARY OF THE INVENTION

Described herein are a method and apparatus for first forming and expanding a strap loop in a novel manner and for finally securing the strap loop tightly around an article.

The method involves pressing a strap against a guide surface and then moving the pressed strap in a path against the guide surface to form a loop. The loop is also expanded during or after formation of the loop. Then, relative movement is effected between the expanded loop and the article to locate the expanded loop about the article. The expanded loop may, if desired, be subsequently tensioned tightly about the article. Finally, the adjacent overlapping portions of the strap loop are joined together by suitable means. If desired, the trailing portion of the strap may be severed from the loop before, during, or after the adjacent overlapping strap portions are joined together.

One embodiment of an apparatus for binding an article in accordance with the teachings of the present invention includes a package support table having a horizontal guide surface against which the free end of a length of thermoplastic strap may be pressed and moved along to form a small, primary strap loop.

A rotatable, cantilevered anvil is provided on the guide surface and is vertically reciprocable with respect to the guide surface along the axis of anvil rotation. The anvil is lowered to engage the strap and is then rotated to move the strap free end in a circle on the guide surface to form a small, primary strap loop.

The portion of the strap trailing the formed loop is restrained against twisting so that the strap necessarily twists within the primary strap loop thereby forcing the loop into a plane substantially perpendicular to the guide surface.

After the primary strap loop has been formed, rotation of the anvil is terminated with a segment of the strap free end restrained from further movement against the guide surface and with a leading segment of the strap free end positioned generally above, and in alignment with, the trailing portion of the strap located below the edge of the guide surface.

The strap is then fed to expand the primary loop to a larger, predetermined diameter and a package is inserted into the expanded loop. The trailing portion of the strap is then pulled to tighten the loop about the package.

The leading segment of the strap is secured to an adjacent, underlying portion of the strap loop, as by forcing the adjacent portion of the strap loop against the overlying strap leading segment between a vertically reciprocable, vibrating welding member and the overlying anvil to effect a friction-fusion weld of the thermoplastic strap.

The strap is severed with a cutter on the welding member at the beginning of the welding sequence as the overlapping strap portions are forced together between the anvil and welding member. After the friction-fusion weld has been completed and after it has cooled, lowering of the welding member permits the strapped package to be removed from the apparatus.

Numerous other advantages and features of the present invention will become readily apparent from the following detailed description of the invention and an embodiment thereof, from the claims, and from the accompanying drawings.

BRIEF DESCRIPTION OF THE DRAWINGS

In the accompanying drawings forming part of the specification, and in which like numerals are employed to designate like parts throughout the same, FIGS. 1-6, taken in ascending numerical order, diagrammatically illustrate the steps of a method for binding an article in accordance with the teachings of the present invention;

FIG. 7A is a perspective view of a preferred embodiment of an apparatus for binding an article in accordance with the teachings of the present invention and shows an enlarged strap loop formed and ready to receive an article to be bound with the strap;

FIG. 7B is an enlarged, fragmentary, cross-sectional view of a portion of the apparatus of FIG. 7A illustrating the anvil assembly;

FIGS. 8-19 are enlarged, fragmentary views of the anvil assembly of the apparatus of FIG. 7A with portions of the apparatus removed to better illustrate interior detail and the views, when taken in ascending numerical order, show the sequence of forming a strap loop and binding a package with the strap loop;

FIG. 20 is a greatly enlarged, perspective view of the apparatus of FIG. 7A with the exterior housing removed to better illustrate the interior mechanisms;

FIG. 24 is a greatly enlarged, fragmentary, cross-sectional view taken generally along the plane 24—24 in FIG. 21;

FIG. 25 is an enlarged, fragmentary view of the top rocker guide and control cam of FIG. 24;

FIG. 26 is an enlarged, cross-sectional view of the anvil shaft and rocker member of FIG. 24;

FIG. 27 is an enlarged, fragmentary, cross-sectional view of the bottom rocker guide, pawl, and control cam taken along the plane 27—27 of FIG. 21;

FIG. 28 is a greatly enlarged, fragmentary, cross-sectional view taken generally along the plane 28—28 in FIG. 22; and FIG. 29 is a fragmentary, cross-sectional view taken generally along the planes 29—29 in FIG. 28.

DESCRIPTION OF THE PREFERRED EMBODIMENT

Figure 1:
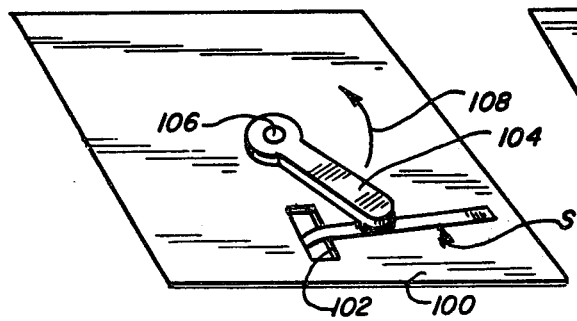

While this invention is susceptible of embodiment in many different forms, there is shown in the drawings and will herein be described in detail specific embodiments of the method and apparatus for effecting the teachings of the invention, with the understanding that the present disclosure is to be considered as an exemplification of the principles of the invention and is not intended to limit the invention to the embodiments illustrated.

The precise shapes and sizes of the components herein described are not essential to the invention unless otherwise indicated, since the invention is described with reference to embodiments which are simple and straightforward.

For ease of description, the apparatus discussed herein will be described in a normal operating position and terms such as upper, lower, horizontal, etc., will be used with reference to this normal operating position. It will be understood, however, that the apparatus may be manufactured, stored, transported and sold in an orientation other than the normal operating position described.

The apparatus illustrated herein has certain conventional drive mechanisms and control mechanisms, the details of which, though not fully illustrated or described, will be apparent to those having skill in the art and an understanding of the necessary functions of such mechanisms.

PACKAGE BINDING METHOD

A basic method for binding an article or package with a loop of strap in accordance with the teachings of the present invention is schematically illustrated in FIGS. 1-6. FIG. 1 shows a guide surface 100 defining a slot 102 through which a strap S passes from beneath the guide surface 100. The strap may be pulled from a suitable source, such as a reel of strap, and/or may be fed by suitable strap feeding means.

An anvil 104 is provided above the guide surface 100 and is adapted to press a leading portion of the strap S flat against the guide surface 100. The anvil 104 is preferably mounted for 360 degree rotation about a shaft 106. The anvil 104 is rotated in the direction of arrow 108 on top of the guide surface 100 thereby moving the leading portion of strap S in a path while the strap is continuously pressed against the guide surface 100 to form a primary strap loop $L_P$ as best illustrated in FIG. 2.

Figure 2:
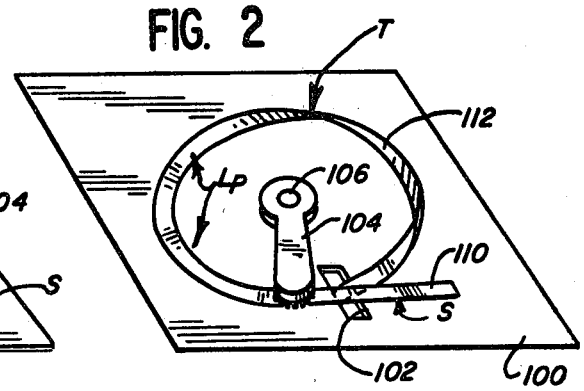

It is to be noted from FIG. 2 that the strap S has a flat, band-like configuration with a first or top surface 110 and a second or bottom surface 112. As the primary strap loop $L_P$ is formed, the strap S undergoes a twisting at region T and the primary loop $L_P$ tends to lift off of the guide surface 100 and become oriented in a substantially vertical plane normal to the plane of the guide surface 100. This phenomenon results from, among other things, the stiffness of the strap S and the relatively small diameter of the primary strap loop $L_P$.

Preferably, as the strap S is moved by anvil 104 to form the primary strap loop $L_P$, the trailing portion of the strap S below the guide surface 100 is restrained from twisting, relative to the leading strap portion above the guide surface 100 so that the twist T in the strap S occurs between the leading strap portion pressed by the anvil 104 and a trailing portion of the strap that is spaced from the pressed or leading strap portion.

Figure 3:
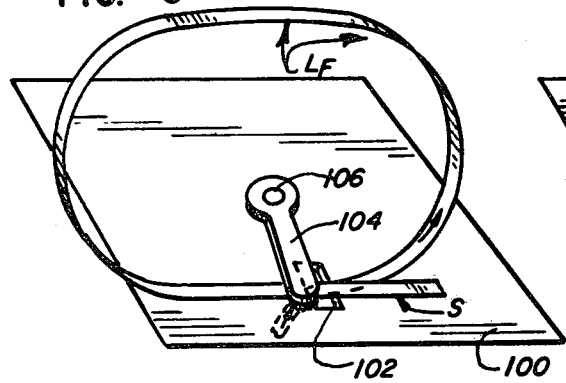
Figure 4:
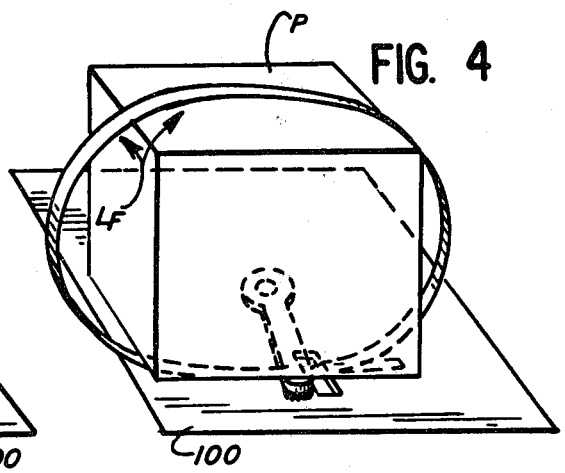
Figure 5:
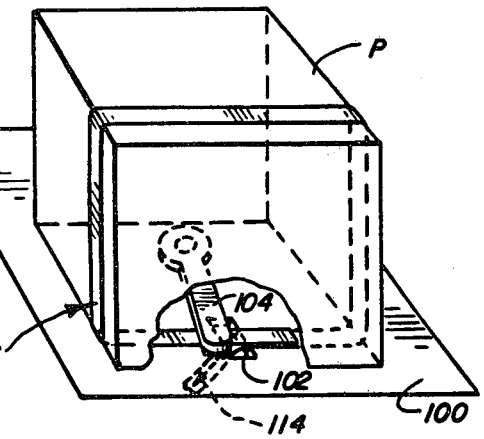

Preferably, rotation of the anvil 104 is terminated so that a portion of the anvil overhangs the slot 102 as illustrated in FIG. 3. Then, while the strap S is pressed against the guide surface 100 by the anvil 104, the trailing portion of the strap S is fed to expand the primary loop $L_P$ to an expanded, final loop $L_F$ that has a predetermined larger size. Then, as best illustrated in FIG. 4, an article, such as package P, is moved into the expanded loop $L_F$.

If the expanded loop $L_F$ is relatively large, the loop $L_F$ may sag, collapse, or fall to one side or the other on top of the guide surface 100. In this case, the strap S could be guided or lifted as desired, by hand or otherwise, to provide an internal loop area of a size and shape suitable for receiving the package P. However, it is to be realized that, depending upon the strap thickness, a loop may be expanded to various larger diameters without collapsing. An expanded loop of relatively thick strap may be self-supporting if it is not too large.

Of course, the package P need not necessarily be moved into the expanded loop $L_F$. Instead, the guide surface 100, and any associated mechanisms carrying the guide surface 100 and loop $L_F$, may be moved to position the loop $L_F$ around a stationary package P.

In any case, after relative movement has been effected between the package P and the expanded loop $L_F$ so as to locate the expanded loop $L_F$ about the package P, the loop $L_F$ is then tensioned about the package P and then sealed in the tensioned state. Specifically, with reference to FIG. 5, the strap S is withdrawn, in the direction of dashed arrow 114, to tighten the loop about the package P. It is to be noted that anvil 104 only partially overlies the slot 102 and thus does not force the leading end segment of the strap S against the trailing portion of the strap S so as to prevent withdrawal of the strap S for tensioning the loop about the package P.

In some situations, as when binding compressed, resilient materials, the strap S need not necessarily be withdrawn to tension the loop about the material. For example, a bale of cotton may be initially highly compressed by suitable auxiliary means (not illustrated) and then positioned within the strap loop $L_F$. Next, the compression on the bale of cotton can be released so that the bale of cotton expands against the loop $L_F$. Of course, the trailing portion of the strap S would be restrained by suitable means to prevent movement of the strap S in response to the outward expansion force of the cotton.

Figure 6:
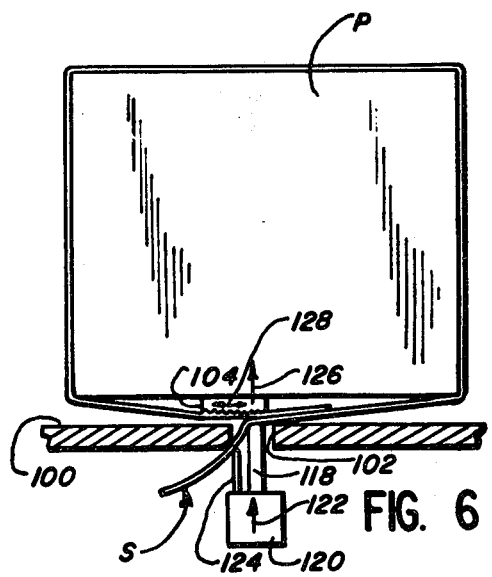

In any case, after the strap S is in tight engagement with the article or package that is being bound, the leading strap portion and an adjacent overlapped portion of the strap loop are joined to secure the loop around the article. There are many methods for joining overlapping strap loop segments. If metal strap is used, sealless joints, comprising interlocking slit deformations of the strap, may be used. Also, sleeve-type seals may be crimped about the overlapping segments of metal strap. If thermoplastic strap is used, a "welded" joint may be effected by heating the overlapping segments of the strap. One such method of joining the overlapping segments of plastic strap, with a friction-fused weld joint, is illustrated in FIG. 6. A weld pad 118 is moved upwardly by a suitable mechanism 120 in the direction of arrow 122 so as to force the weld pad 118 against the trailing portion of the strap S. The trailing portion of the strap S is forced upwardly against the underside of the overlapping strap free end which is forced against the portion of anvil 104 that overhangs the slot 102.

A cutting blade 124 may also be carried upwardly by mechanism 120 to sever the trailing portion of the strap S from the loop. Of course, the trailing portion of the strap S should not be severed by blade 124 until the overlapping strap segments are securely pressed between the anvil 104 and the weld pad 118. To this end, anvil 104 may be normally biased downwardly (by suitable means not illustrated) toward guide surface 100 and also have the capability for being moved upwardly a small amount against the downward bias. Thus, upward movement of the weld pad 118 would initially press the overlapping strap segments tightly together against the anvil 104. Further movement of weld pad 118 and cutter 124 upwardly would overcome the downward bias on the anvil 104 and force the anvil 104 upwardly (in the direction of arrow 126 in FIG. 6). During this further upward movement, the trailing portion of the strap S would be severed by the cutter 124.

In the slightly elevated position, the part of the strap loop around the bottom of the package P would no longer be in contact with the guide surface 100. Then rapid oscillatory movement of the anvil 104 (in the directions of double headed arrow 128 in FIG. 6) would cause the strap free end to be moved back and forth with respect to the stationary underlying portion to generate heat by friction and effect interface melting therebetween. After holding the overlapping strap segments together for a period of time sufficient to allow cooling of the weld, the mechanism 120 lowers the weld pad 118 and cutter 124 to permit the strapped package P to be removed.

Although the guide surface 100 is illustrated in FIGS. 1-6 as being generally flat, it is to be realized that the guide surface 100 need not be flat. It may be curved, undulating, frustoconical, etc. In such a case, the anvil 104 may have to be provided with a compatible shape and/or drive mechanism so that the anvil 104 tracks properly on non-flat surface.

Also, during the friction welding step (FIG. 6), the anvil 104 need not be raised off of the guide surface 100. However, raising the anvil 104 off of the surface 100 helps to ensure that the strap will not be heated by friction against the guide surface 100 and thus helps to ensure that the melting of the strap material is confined to the interface of the overlapping strap segments at the weld joint region.

PACKAGE BINDING APPARATUS

A preferred embodiment of an apparatus for binding an article in accordance with the teachings of the present invention is illustrated in FIGS. 7A-29. FIG. 7A shows the apparatus 150 in the form of a relatively small countertop unit adapted for binding articles or packages with a loop of thermoplastic flat strap.

As best illustrated in FIG. 7A, the apparatus 150 includes a base 152, a package support table 154, a strap reel housing 156, and a package-actuated cycle switch cover 158. The table 154 defines a slot 160 through which the strap S passes from the interior of the apparatus to form the strap loop. The strap S is fed from a supply or source of strap, such as reel 162 in the housing 156, by mechanisms explained in detail hereinafter.

The switch cover 158 may be provided with a pair of spaced-apart ribs 159 on either side of the slot 160. The ribs 159 project outwardly over the table 154 and can function to provide lateral support to the expanded loop of strap S to prevent the loop from falling sideways.

Within the table 154, adjacent the cycle switch cover 158, is an anvil assembly 164 (FIG. 7A). As best illustrated in FIGS. 7B and 8, the anvil assembly 164 includes a rotatable anvil 204, a vertically reciprocable lift member or feed pad 205, and a vertically reciprocable weld pad 218.

Figure 21:
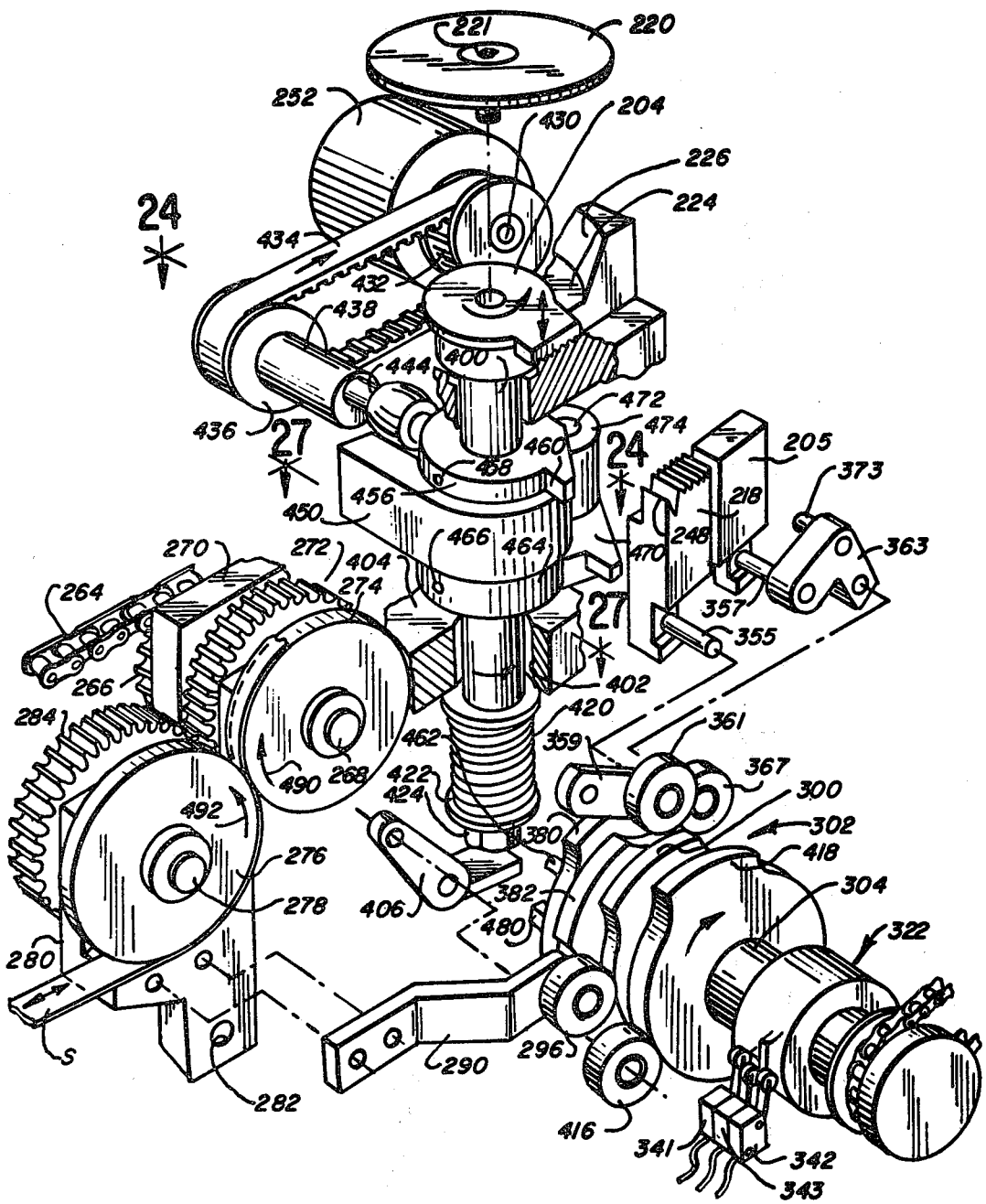
FIG. 21 is an even further enlarged, perspective, exploded view of some of the mechanisms illustrated in FIG. 20 with some of the mechanism components omitted for clarity.

As best illustrated in FIG. 8, the anvil 204 has a disc-like configuration with an outwardly extending lug 222, the bottom of which lug 222 is serrated to enhance the gripping action on the top surface of the strap S. Mounted to the top of the anvil 204 is a cover plate 220 which has a generally circular configuration and is larger in diameter than the disc-like anvil 204. The cover plate 220 is suitably secured, as by welding or gluing, to the anvil 204. The connected assembly of the cover plate 220 and anvil 204 are secured by means of an allen head screw 221 to a shaft 400 (FIG. 21).

As best illustrated in FIGS. 7B and 9, the anvil 204 and cover plate 220 are received on a guide surface 224 in a cavity defined by a sloping sidewall 226 in the table 154. When the anvil 204 and cover plate 220 are mounted within the receiving cavity above guide surface 224, the top surface of the cover plate 220 is flush with the surface of the table 154 and serves to support a package placed thereon. As can be seen with reference to FIG. 7B, there is a space between the circumference of the cover plate 220 and the sloping sidewall 226 of the table 154 to accommodate the strap S.

As best illustrated in FIGS. 7B, 8 and 9, the strap S is carried from the strap reel 162 by the table 154 in a suitable restraining guide or channel 228. The channel 228 opens, as best illustrated in FIG. 7B, in a vertical face 230 adjacent the weld pad 218.

The weld pad 218 and feed pad 205 are disposed between the vertical face 230 and an opposed vertical face 232. Both the weld pad 218 and feed pad 205 are vertically reciprocable by mechanisms not visible in FIGS. 7A-19.

FIGS. 8-19, taken sequentially in ascending numerical order, illustrate in detail the sequence of operation of the anvil, feed pad, and weld pad in binding a package P with a loop of strap S. After discussing the operation sequence, the mechanisms for effecting the operation of the anvil, feed pad, and weld pad will be explained in detail with reference to FIGS. 20-29.

SEQUENCE OF OPERATION

Before a package is placed on the apparatus 150, the strap S is formed into a relatively small, primary strap loop and is then expanded into a larger, final loop of a predetermined size suitable for receiving the package to be bound. To form the small, primary strap loop, the strap S is first fed through the channel 228 over the weld pad 218 and feed pad 205 as illustrated in FIGS. 8 and 9. During this step in the sequence, the weld pad 218 and feed pad 205 are each maintained in a lowered position below the level of channel 228 and guide surface 224.

After a predetermined length of strap S has been fed over the feed pad 205, the feed pad 205 is raised, as illustrated in FIG. 10 in the direction of arrow 234, so as to push a leading segment of the strap upwardly to the level of the guide surface 224. At the same time, as illustrated in FIG. 11, the anvil 204 is lowered in the direction of arrow 236 and is initially rotated through a predetermined arc in the direction of arrow 238 thereby engaging the strap on the feed pad 205 and moving the engaged portion of the strap off of the feed pad onto the guide surface 224. Then, as illustrated in FIG. 12, the feed pad 205 is lowered as indicated by arrow 240.

The anvil 204 is continued to be rotated on the guide surface 224, as illustrated in FIGS. 13-15, to twist the strap at T and form the strap S into a primary loop. During formation of the primary loop, the strap S is pulled by the anvil 204 from the strap supply (in the direction of arrow 242 in FIG. 15). As illustrated in FIG. 15, movement of the strap S into a loop by the anvil 204 causes the strap loop to flex upwardly away from the guide surface 224.

Although the primary loop can be suitably formed by the anvil 204 pulling the strap S from a free-wheeling supply drum or from a slack length of strap, the strap S may also simultaneously be positively fed forward by a feeding means (such as the cooperating traction wheels 274 and 276 described in detail hereinafter with reference to FIGS. 20 and 21).

The rotation of anvil 204 is terminated, as illustrated in FIGS. 7B and 16, with a portion of the anvil lug 222 overlying the guide surface 224 and with a portion of the lug 222 extending outwardly from face 230 over the weld head 218. In this manner, a leading segment of the strap S is restrained from movement by being pressed against the guide surface 224 while the trailing portion of the strap S remains unrestrained below the anvil 204 and above the lowered weld pad 218.

With the strap free end restrained against further movement by the anvil 204, the trailing portion of the strap S is fed in the direction of the arrows 243 as illustrated in FIG. 16. This feeding of the strap S expands the primary strap loop to a larger size. When the strap loop has been expanded to the size desired, the package P may be inserted within the loop as illustrated in FIG. 17.

A part of the expanded loop extends between the ribs 159 on the switch cover 158 (FIG. 7A). If the loop tends to fall sideways in either direction, a portion of the strap S will fall against one of the ribs 159. Depending upon the thickness of the strap S and the diameter of the expanded loop, the one rib may then function as a means for preventing the expanded loop from falling into a completely horizontal plane on the table 154. Thus, the loop may "tilt" somewhat from the vertical, but it will remain sufficiently upright to facilitate package insertion. If the loop is so large that it nevertheless falls past the ribs 159 to the completely horizontal position, the loop can be manually lifted as necessary to facilitate package insertion.

The package P is properly placed in the loop by pushing the package into the loop and then back against the cycle switch cover 158 (FIG. 7A) which is movable rearwardly a small amount. A cycle switch SW is positioned behind the switch cover 158 (as shown in FIG. 18 with the switch cover removed) and is actuated by the rearward movement of the cover 158. The actuation of the cycle switch SW energizes the strap tensioning mechanism (described in detail hereinafter) to withdraw the trailing portion of the strap S in the direction of arrow 244, as illustrated in FIG. 18, to tension the loop tightly about the package P.

After the strap S has been drawn tightly around the package P, the weld pad 218 is moved upwardly in the direction of arrow 246 (FIG. 19) to press the overlapping loop strap segments between the weld pad 218 and the anvil 204. The anvil 204 is preferably spring-biased downwardly toward the guide surface 224 and moves upwardly in response to the upward movement of the weld pad 218. The anvil 204 may raise the package upwardly a small amount as the anvil is forced upwardly. As the weld pad and anvil move upwardly with the overlapping strap segments pressed therebetween, a cutter blade 248 (FIGS. 7B and 19) severs the trailing portion of the strap from the strap loop.

The weld pad 218 is raised only a relatively small amount above the bottom of the strap guide surface 224—to a height sufficient to enable the trailing portion of the strap S to be cut by the cutter blade 248 and to lift the portion of the strap S below the package P off of the strap guide surface 224. Next, the anvil 204 is oscillated, by a mechanism to be described in detail hereinafter, to effect a friction-fusion weld of the strap. With the particular embodiment of the apparatus described herein, the feed pad 205 is also raised as the weld pad is raised. However, the weld pad 218 moves upwardly a greater amount than the feed pad 205 so that the overlapping strap segments pressed between the weld pad 218 and the anvil 204 are clear of the top of the raised feed pad 205 as well as the bottom of the cavity 224. Subsequently, both the feed pad 205 and the weld pad 218 are lowered after the friction-fusion weld has been completed and has sufficiently cooled.

The anvil 204 is next raised to a slightly more elevated position by suitable means (described in detail hereinafter) while the weld pad 218 is lowered so as to provide adequate clearance for removal of the strapped package from the apparatus. This further upward movement of the anvil 204 may lift the package upwardly a slight additional amount.

The novel mechanisms for feeding and tensioning the strap S, operating the anvil 204, and operating the feed pad 205 and weld pad 218 will next be described in detail with reference to FIGS. 20-29.

STRAP FEEDING AND TENSIONING MECHANISM

FIG. 20 illustrates the apparatus 150 with the base 152, table 154, and reel housing 156 removed to better show the interior components mounted to a base plate 249. Three separate motors are provided: a strap feeding and tensioning motor 250, an anvil rotating and oscillating motor 252, and a cam drive motor 254.

Figure 22:
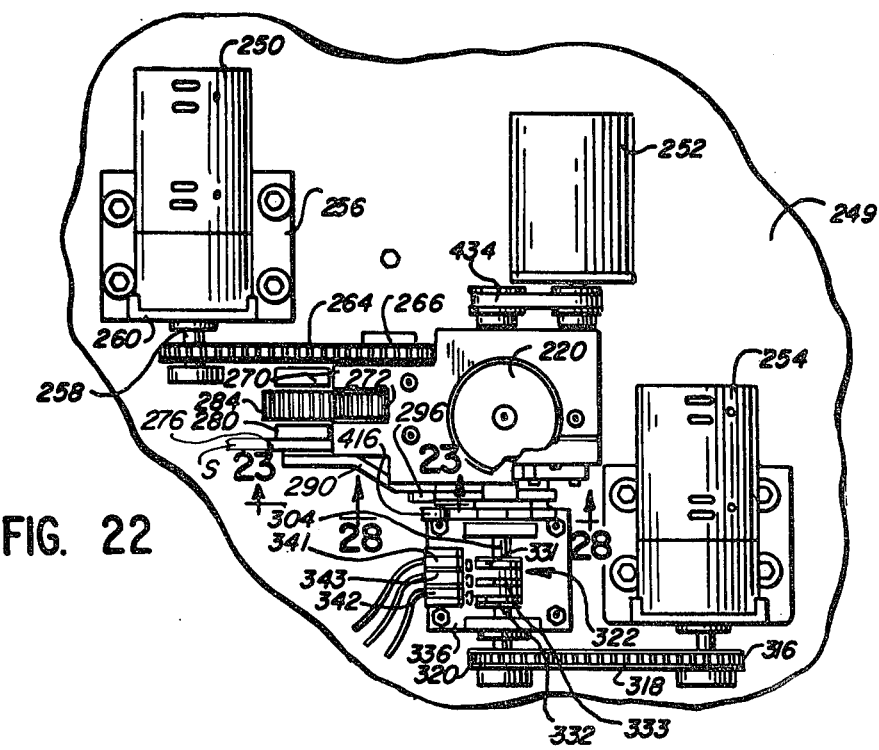
FIG. 22 is a reduced, fragmentary, plan view of the apparatus interior mechanisms illustrated in FIG. 20.

As best illustrated in FIGS. 20 and 22, the strap feeding and tensioning motor 250 is mounted on a plate 256 and has an output shaft 258 journaled in a vertical support plate 260. The shaft 258 carries a sprocket 262 (FIG. 20) around which is trained a drive chain 264. The drive chain 264 is also trained around a driven sprocket 266 (FIGS. 21 and 22) mounted to a shaft 268 journaled in a support plate 270 (FIGS. 20 and 21).

On the side of support plate 270 opposite the sprocket 266, the shaft 268 carries another gear 272 and a rotatable, fixed-axis traction wheel or feed wheel 274 (FIG. 20) which rotate with the shaft. Adjacent the fixed-axis feed wheel 274 is a movable traction wheel or feed wheel 276 which is mounted on and keyed to a shaft 278 that is journaled in a pivotable support plate 280. The support plate 280 is pivotally mounted through bore 282 (FIG. 21) by means of a pin 288 (FIGS. 20 and 23) to a fixed plate 286.

Figure 23:
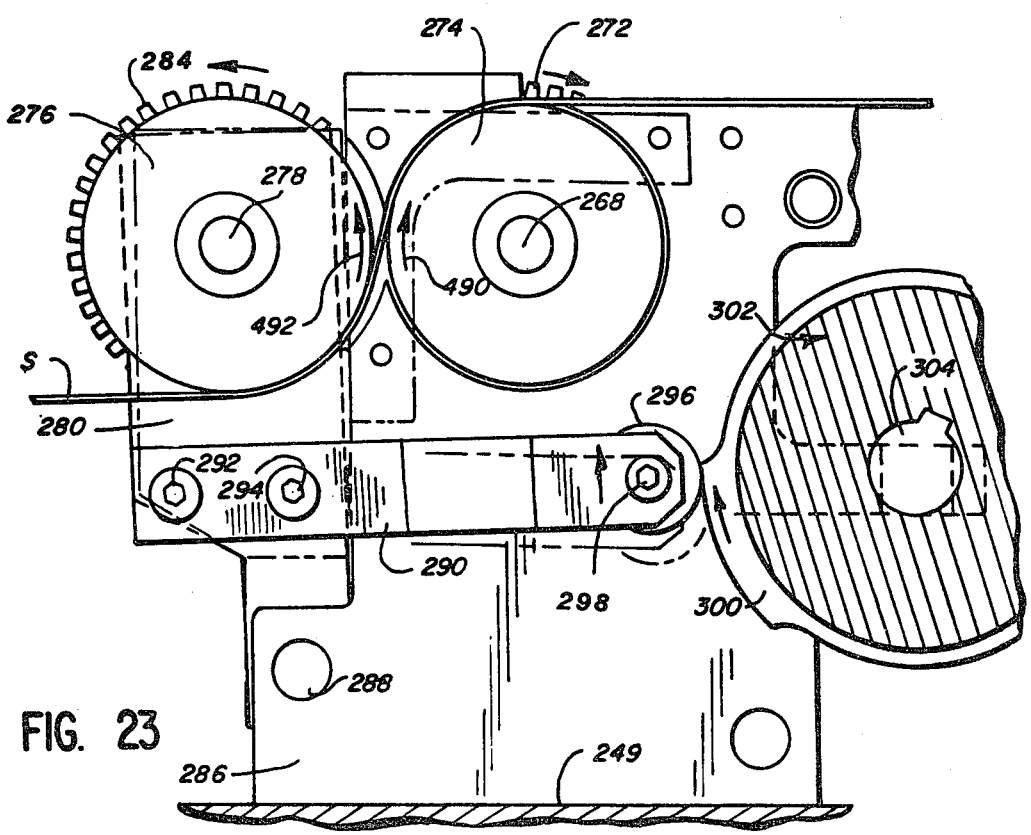
FIG. 23 is a greatly enlarged, fragmentary, cross-sectional view taken generally along the plane 23—23 in FIG. 22.

The shaft 278 of feed wheel 276 carries a gear 284 for rotation therewith (FIG. 20). With reference to FIG. 23, the plate 280 is normally biased to a first position (to the right by a suitable spring, not illustrated), in which the gear 284 is engaged with the sprocket 272 associated with feed wheel 274.

Thus, when the gear 284 is engaged with the gear 272, rotation of the shaft 268 causes rotation of the gear 272 and hence rotation of the shaft 278. Both feed wheel 274 and feed wheel 276 are mounted for rotation with shafts 268 and 278, respectively, and thus the feed wheels rotate in opposite directions to frictionally engage and pull the strap S trained between the two feed wheels. Rotation of motor 250 in one direction will cause the strap S to be fed forward into the apparatus while rotation of the motor 250 in the opposite direction will cause the strap S to be withdrawn from the apparatus.

The plate 280 can be pivoted to a second position (to the left in FIG. 23), in which the gear 284 is disengaged from the gear 272. The plate 280 is pivoted to the left by an arm 290 which is secured to plate 280 by means of screws 292 and 294 and which has, at the opposite end, a roller 296 mounted for rotation about screw 298.

As best illustrated in FIGS. 20 and 23, the roller 296 is adapted to be engaged by cam 300 formed on a control cam drum 302 which is mounted for rotation on a cam shaft 304. Shaft 304 is suitably journaled in a pair of upstanding support plates 306 and 308. When the cam drum 302 rotates cam 300 (by mechanisms to be described in detail hereinafter) to engage the roller 296 on arm 290, the plate 280 is pivoted toward the left (as viewed in FIG. 23) to move the feed wheels 274 and 276 apart. Thus, even though the feed wheel 274 may be continued to be rotated by motor 250, the strap S would not be sufficiently frictionally engaged with the feed wheels to permit continued pulling of the strap S. The rotating feed wheel 274 would merely slip against the strap S.

When the cam 300 has rotated past the roller 296, the plate 280 is urged to the right, as viewed in FIG. 23, by means of the return spring (not illustrated). The strap S is then pressed in frictional engagement between the feed wheels and the gear 284 is re-engaged with gear 272 so that both feed wheels can rotate together to pull the strap.

CAM DRIVE MECHANISM

As best illustrated in FIGS. 20 and 21, the control cam drum 302 is rotated by means of a cam drive motor 254. Specifically, motor 254 has an output sprocket 316 around which is trained a drive chain 318. Mounted to the cam shaft 304, outboard of plate 308, is a sprocket 320 around which the chain 318 is also trained. Thus, the shaft 304 is driven through chain 318 by motor 254.

Mounted on shaft 304, between the two plates 306 and 308, is a switch cam drum 322 which rotates along with control cam drum 302 on cam shaft 304. The switch cam drum 322 includes a first switch cam 331, a second switch cam 332 and a third switch cam 333. Mounted to a base plate 336 are switches 341, 342, and 343, which are associated with, and aligned with, the switch cams 331, 332, and 333, respectively, for actuation thereby. Actuation of the switches operates the three motors in the proper sequence.

The first switch 341 is associated with the anvil rotating and oscillating motor 252, the second switch 342 operates the cam drive motor 254, and the third switch 343 operates the strap feeding and tensioning motor 250. The actuation of the switches by the switch cam drum 322 and the resulting operation of the individual motors will be described in detail hereinafter.

WELD PAD AND FEED PAD ACTUATING MECHANISMS

The mechanisms for raising and lowering the weld pad 218 and feed pad 205 will next be described with reference to FIGS. 7B, 21, and 28. As best illustrated in FIG. 28, weld pad 218 and feed pad 205 are retained behind plate 286 which has an elongated slot 351 communicating with the weld pad 218 and an elongated slot 353 communicating with the feed pad 205.

As best illustrated in FIG. 21, a pin 355 passes through the slot 351 and is received in the weld pad 218. Similarly, a pin 357 passes through the slot 353 and is received in the feed pad 205. As best illustrated in FIG. 28, pin 355 is carried at the end of a weld pad actuating arm 359 and extends beyond the arm 359 an amount sufficient to carry a roller 361 rotatably mounted thereon. Similarly, pin 357 is carried on the end of an L-shaped feed pad actuating arm 363. The other end of L-shaped arm 363 carries a pin 365 to which is rotatably mounted a roller 367.

The weld pad actuating arm 359 is pivotably mounted by means of a pin 369 to the vertical side plate 286 as best illustrated in FIG. 20 and is spring biased downwardly against the cam drum 302 by means of a helical compression spring 371.

The feed pad actuating arm 363 is pivotably mounted to vertical plate 286 by pin 373. Arm 363 is biased inwardly to hold the roller 367 against the cam drum 302 by means of a spring 375 mounted in a spring support block 377 as best illustrated in FIG. 20. The spring support block 377 is secured to the vertical support plate 286 by means of a screw 379.

As best illustrated in FIGS. 20 and 21, the cam drum 302 has a cam 380 for engaging the roller 367 of the feed pad actuating arm 363. Similarly, the cam drum 302 has a cam 382 for engaging the roller 361 on the weld pad actuating arm 359. Rotation of the cam drum 302 by means of the cam drive motor 254 will thus effect raising and lowering of the weld pad 218 and feed pad 205 as necessary during the strapping cycle.

ANVIL OPERATING MECHANISM

The novel mechanism for operating the anvil 204 will next be described in detail with reference to FIGS. 21 and 24-28 in particular.

As best illustrated in FIG. 21, the anvil 204 is mounted with cover plate 220 to a shaft 400 with screw 221 for rotation with the shaft. The shaft 400 is vertically oriented in a bore 402 of a bearing block 404. The shaft 400 is adapted to rotate about its longitudinal axis and to be reciprocated vertically along the axis by mechanisms described in detail hereinafter.

Vertical movement of the shaft 400 and anvil 204 is effected by the control cam drum 302 through a linkage system acting on the bottom of the shaft 400. Specifically, an anvil lift cam 406 is positioned below the bottom of the shaft 400. The cam 406 is pivotally mounted with a pin 410 to a fixed block 412 (FIG. 29). As best illustrated in FIG. 28, the upper end of the cam 406 carries a pin 414 to which is rotatably mounted a roller 416. The roller 416 engages the control cam drum 302 and is adapted to be cammed outwardly by cam 418 on the drum 302. When the roller 416 is moved outwardly by the cam 418, the anvil lift cam 406 pivots (counterclockwise as viewed in FIG. 28) about pin 410 to lift the anvil shaft 400 and anvil 204 upwardly.

As best illustrated in FIG. 21, a helical coil compression spring 420 is mounted around the lower end of the shaft 400. The upper end of the spring 420 is engaged with the underside of the bearing block 404 and the bottom end of the spring 420 bears against a ring 422 held on the bottom of the shaft 400 by means of an adjustable retaining nut 424. Thus, the shaft is normally biased downwardly by spring 420 against the anvil cam 406 to hold the roller 416 against the control cam drum 302. In this lowered position, the anvil 204 is held against the strap lying thereunder (as illustrated in FIG. 10). However, rotation of the control cam drum 302, in response to the control system to be described hereinafter, will cause cam 418 to engage the cam roller 416 and lift the anvil shaft 400 and anvil 204 to an elevated position. The force of spring 420 on shaft 400 can be adjusted by means of the nut 424.

The anvil is rotated with shaft 400 to form the primary strap loop and is oscillated to form the friction-fusion weld by means of motor 252 acting through a novel mechanism. Specifically, with reference to FIGS. 21 and 24, the motor 252 has a shaft 430 to which is mounted a pulley 432 for rotation therewith. A toothed drive belt 434 is trained around pulley 432 on one end and around a pulley 436 at the other end. A shaft 438 is mounted to the pulley 436 for rotation therewith. The shaft 438 rotates within a pair of bearing support blocks 440 and 442 (illustrated in FIG. 24 but omitted for purposes of clarity from FIG. 21).

Projecting from the end of shaft 438 is an offset or eccentric cylindrical shaft 444. Eccentric shaft 444 carries thereon a roller 446 which is free to rotate on eccentric shaft 444. The eccentric shaft 444 and roller 446 are received within an opening 448 of a rocker member 450.

The rocker member 450 is mounted on the anvil shaft 400 and includes a one way clutch for engaging shaft 400. As best illustrated in FIG. 26, the clutch may be of the type that has the form of a plurality of inwardly facing clutch teeth 452 which trap cylindrically shaped rollers 454 therebetween and wherein the teeth 452 are shaped to allow the rocker member 450 to rotate freely in one direction about shaft 400 (clockwise in FIG. 26) but bind the rollers 454 against the shaft 400 when the rocker member 450 is rotated in the opposite direction (counterclockwise in FIG. 26) thereby causing the rocker member 450 and the shaft 400 to rotate together. Such a clutch mechanism is of a well-known conventional design and further description or illustration of such a clutch mechanism is unnecessary.

The rocker member clutch engages and disengages as necessary during the rotation of the anvil to form the strap loop and during the subsequent friction-fusion welding oscillation of the anvil. This operation will be explained in detail after first describing the rocker guide and pawl mechanisms that cooperate with the rocker member 450 and with the control cam drum 302 to initially rotate the anvil through a predetermined arc.

As best illustrated in FIGS. 21, 24, and 25 a top rocker guide 456 is secured to shaft 400 by means of pin 458 and has an outwardly projecting lug 460 adapted to be engaged by a cam 462 on control cam drum 302. The cam 462 is carried on the end face of control cam drum 302 and thus rotates in a circle oriented in the vertical plane parallel to the longitudinal axis of the anvil shaft 400. When the cam 462 is rotated into engagement with the lug 460, the shaft 400 and anvil 204 are rotated together through a predetermined angle as the cam 462 is carried past the lug 460. This effects the movement of the strap from the feed pad 205 onto the guide surface 224 as best illustrated in FIG. 11.

A bottom rocker guide 464 is secured to shaft 400 below the rocker member 450 by means of a pin 466. As best illustrated in FIG. 27, the bottom rocker guide 464 defines a notch or detent 468 along its outer circumference for receiving and being engaged by a pawl 470. As best illustrated in FIG. 24, the pawl 470 is mounted adjacent the bottom rocker guide 464 by means of a pin 472 to the bottom of a lug 474 projecting outwardly from the rocker member 450.

The end of the pawl 470 opposite the bottom rocker guide notch 468 defines a bore 476 in which is received a helical compression spring 478. The spring 478 extends out of the bore 476 and bears against the side of the rocker member 450 to bias the pawl 470 (clockwise as viewed in FIGS. 24 and 27) into engagement with the notch 468 of the bottom rocker guide 464.

With continued reference to FIGS. 21, 24 and 27, the control cam drum 302 is seen to include an additional cam 480 on the end surface thereof for engaging the distal end of the pawl 470. The cam 480, like cam 462, rotates in a circle in a vertical plane parallel to the longitudinal axis of the anvil shaft 400. Thus, rotation of control cam drum 302 will bring cam 480 into engagement with pawl 470 to thereby disengage the pawl 470 from the notch 468 of the bottom rocker guide 464.

When the pawl 470 is moved by the control cam lug 480 to disengage from the notch 468 of the bottom rocker guide 464, the rocker member 450 is free to rotate on the anvil sheet 400 in the clockwise rotation direction as viewed in FIG. 24. In this case, rotation of the eccentric shaft 444 within the rocker member opening 448 will cause incremental, but uni-directional, rotation of the anvil shaft 400 about its longitudinal axis. That is, when the eccentric shaft 444 has rotated to the position illustrated in FIG. 24, the roller 446 carried on the eccentric shaft 444 engages the left-hand side of the opening 448 of the rocker member 450. This tends to rotate the rocker member 450 (in the counterclockwise direction as viewed in FIG. 24). However, the clutch rollers 454 are bound between the rocker member 450 and the anvil shaft 400 so that the shaft 400 necessarily rotates counterclockwise with the initial incremental rotation of the rocker member 450.

As the eccentric shaft 444 continues to rotate within the opening 448 of the rocker member 450, the roller 446 on the eccentric shaft 444 begins to engage the opposite sides of the rocker member 450 and thus rotates the rocker member in the opposite direction. In this direction of rotation, the clutch rollers 454 are freed and there is no driving of the anvil shaft 400 in that direction by the rocker member 450. Consequently, the anvil shaft 400 is stationary during one half of the rotation cycle of eccentric shaft 444. The anvil shaft 400 is thus driven in half cycle increments in only the counterclockwise direction, as viewed in FIG. 24, to rotate the anvil in a circular arc. This corresponds to the anvil movement illustrated in FIGS. 12-16.

When the control cam 302 has rotated to move the cam 480 completely past the pawl 470, the pawl 470 is returned by bias spring 478 back against the circumference of the bottom rocker guide 464. However, since the bottom rocker guide 464 turns with the anvil shaft 400, the pawl 470 does not engage the notch 468 until the anvil has made a complete revolution. After anvil has been rotated around to its original position, pawl 470 re-engages the notch 468 of bottom rocker guide 464.

When the pawl 470 is re-engaged with the notch 468 on the bottom rocker guide 464, the half cycle rotation of the rocker member 450 in the clockwise direction by eccentric shaft 444, as viewed in FIG. 24, will cause the pawl 470 to rotate the anvil shaft 400 through a small arc in the clockwise direction. On the other hand, the half cycle rotation of the rocker member 450 in the counterclockwise direction will cause the anvil shaft 400 to rotate through a small arc in the counterclockwise direction because of the clutch engagement. In effect, the rocker member 450 is locked against movement relative to the shaft 400. Thus, when the pawl 470 is engaged, rotation of the eccentric shaft 444 within the rocker member opening 448 will cause the rocker member 450 and anvil shaft 400 to oscillate about the longitudinal axis of anvil shaft 400. This movement is used during the friction-fusion weld sequence to join the overlapping strap segments.

APPARATUS OPERATING SEQUENCE

The sequence of operation of one complete strapping cycle will next be described. A strapping sequence begins with an enlarged strap loop having already been formed just before termination of the end of the previous cycle. The enlarged strap loop has the orientation substantially as shown in FIG. 7A.

To initiate the strapping cycle, a package is placed within the enlarged strap loop of the apparatus 150 (FIG. 7A) and against the cycle switch cover 158. The cycle switch (switch SW in FIG. 18) is actuated by the inward movement of the cycle switch cover 158.

The cycle switch energizes the strap feeding and tensioning motor 250 which rotates in the strap tensioning direction to rotate the pressed-together strap feed wheels 274 and 276 to tighten the loop about the package. When the strap has been pulled to a predetermined tension, the strap feeding and tensioning motor 250 stalls.

A suitable conventional electrical control circuit senses the stalling of motor 250 and energizes the cam drive motor 254 to begin rotation of the switch cam drum 322 and control cam drum 302 with cam shaft 304. Simultaneously, the strap feeding and tensioning motor 250 is de-energized and an electrical brake (not illustrated) associated with motor 250 is actuated to hold the strap tension around the package.

The cam drive motor 254 rotates to drive the cam shaft 304 in the clockwise direction as viewed in FIG. 28. The sequence of the apparatus operation is effected within a single 360 degree revolution of the cam shaft 304 as explained in detail hereinafter.

For discussion purposes, the rotation of the cam shaft 304 is designated as having a 0 degree rotation reference position at the beginning of the last half of the previous strapping cycle. In the last half of the previous strapping cycle, the cam shaft 304 had rotated from the 0 degree reference position to 150 degrees of a complete revolution during the formation of the new, expanded strap loop as illustrated in FIG. 7A.

With the cam shaft 304 rotated 150 degrees, wherein the expanded loop is ready to receive a package, the cam shaft 304 is said to be at the "home position" and the apparatus is ready to begin a new packaging cycle. When the new package is placed within the loop to actuate the cam drive motor 254, the cam shaft 304 begins rotating from the 150 degree "home position."

As the shaft 304 rotates from the "home position", the control cam drum 302 and the switch cam drum 322 both rotate with the shaft. After the control cam drum 302 has rotated to 160 degrees of full rotation (i.e., 160 degrees from the reference position), the downwardly curved end of cam 380 (FIGS. 21 and 28) begins to move past the roller 367 on the feed pad actuating arm 363. The actuating arm spring 375 then rotates the arm 363 about its pivot pin 373 to raise the feed pad 205 to the elevated position. At 174 degrees of cam shaft rotation from the reference position, the feed pad 205 is fully elevated. Also at 174 degrees of cam shaft rotation, the cam 382 begins to engage the roller 361 for raising the weld pad 218. At 195 degrees of cam shaft rotation from the reference position, the weld pad 218 has been raised to the maximum elevation. At this maximum elevation, the top of the weld pad 218 is higher than the top of the feed pad 205 and has forced the overlapping strap segments upwardly against the underside of the anvil 204 as illustrated in FIG. 19.

In addition, the upward movement of the weld pad 218 raises the anvil 204 a slight amount (against the bias of the compression spring 420 at the bottom of the anvil shaft 400). The upward movement of the anvil 204 permits the overlapping strap segments to be raised off of the strap cavity guide surface 224. During the upward movement of the weld pad 218 and anvil 204 together, the cutter blade 248 severs the trailing portion of the strap.

At 195 degrees of cam shaft rotation, switch 341 is actuated by its associated cam 331 (FIG. 20) to energize the anvil rotating and oscillating motor 252 to weld the loop overlapping strap segments together. In this welding position, the pawl 470 is engaged with the bottom rocker guide notch 468 (FIGS. 24 and 27) so that the rocker member 450 is locked to the anvil shaft 400 as a result of the combined restraints of the pawl and rocker member clutch. Hence, as explained in detail above, rotation of the eccentric shaft 444 within the rocker member 450 by the motor 252 will cause oscillation the shaft 400 and the anvil 204 connected thereto to effect the friction-fusion weld. As the weld is being formed, the anvil 204 and weld pad 218 are in the position illustrated generally in FIG. 19.

The amplitude of the anvil oscillation is preferably about ⅛th inch and the frequency of the oscillation is preferably between 5000 and 6000 Hertz. Under these conditions, the shaft and anvil are preferably oscillated for about 0.25 seconds to effect the friction-fusion weld of the overlapping strap segments.

As switch cam 331 passes switch 341 at 295 degrees of cam shaft rotation, the switch 341 is released (i.e., reset) to de-energize the anvil rotating and oscillating motor 252. Though the anvil 204 is no longer oscillated, the weld pad 218 and anvil 204 are maintained in their elevated positions with the overlapping strap segments pressed therebetween while the weld cools. This holding period is preferably about 0.1 second.

At 315 degrees of cam shaft rotation, the weld pad 218 is urged downwardly away from the welded strap. Specifically, cam 382 is carried past the roller 361 to allow the roller 361 to be urged inwardly against the cam drum 302 by the spring 371 (FIG. 20). This pulls the weld pad 218 downwardly toward the lowered position. The weld pad reaches the lowermost position after the control cam drum 302 has rotated 330 degrees from the reference position.

When the weld pad 218 is beginning to move to the lowered position, at 315 degrees of full cam shaft rotation, the anvil 204 begins to move further above the strap guide surface 224. Specifically, cam 418 begins to engage roller 416 and push it outwardly. This causes the anvil lift cam 406 to pivot upwardly and push the anvil shaft 400 upwardly. This carries the anvil 204 upwardly (further compressing the shaft spring 420) to provide even more clearance for removal of the strapped package. The anvil reaches its maximum elevation when the cam shaft 304 has rotated 330 degrees from the reference position.

At 330 degrees of cam shaft rotation, the feed pad 205 begins to descend. To this end, the cam 380 engages the roller 367 on the feed pad actuating arm 363 to pivot the arm (counterclockwise as viewed in FIG. 28) to move the feed pad 205 downwardly. At 350 degrees of cam shaft rotation, the feed pad 205 has been moved to its downwardmost position.

At 345 degrees of cam shaft rotation, the switch 342 is actuated by switch cam 332 (FIGS. 20 and 21) to de-energize the cam drive motor 254. The motor 254 coasts to a stop with the cam shaft 304 at 360 degrees of full rotation (i.e., back to the initial reference position). At this point, the strapped package would typically be removed. However, the package may be removed anytime after the anvil is raised to its maximum elevation (330 degrees of cam shaft rotation).

When the strapped package is removed from the table of the strapping apparatus 150, the cycle switch cover 158 (FIG. 7A) is permitted to be biased outwardly to its normal position by the cycle switch (SW FIG. 18) and/or suitable bias means as the internally biased cycle switch resets.

The resetting of the cycle switch re-starts the cam drive motor 254. This occurs with the cam shaft at the reference position (0 degrees of full cam shaft rotation). At 15 degrees of cam shaft rotation, the switch 343 is actuated by switch cam 333 (FIG. 20) to energize the strap feeding and tensioning motor 250 in the strap feeding direction. The strap feeding and tensioning motor 250 is energized through contacts in a conventional off-delay timer (not illustrated), which contacts are closed through a suitable relay when switch 343 is actuated by the cam 333. As explained hereinafter in detail, the timer later operates to de-energize the motor 250 at the desired time.

When the motor 250 is energized as explained above, the feed wheels 274 and 276 rotate in the directions to feed the strap S forward into the apparatus as illustrated in FIG. 9. Specifically, with reference to FIG. 21, feed wheel 274 is rotated in the clockwise direction as indicated by arrow 490 while feed wheel 276 is rotated in the counterclockwise direction as indicated by arrow 492. It is to be realized that at this step in the sequence, the pivotally mounted plate 280, which carries the feed wheel 276 and its gear 284, is biased (to the right as viewed in FIGS. 21 and 23) by a suitable spring (not illustrated) against the strap S and the adjacent feed wheel 274.

At 32 degrees of cam shaft rotation, control cam 380 has passed the roller 367 on the feed pad actuating arm 363, to allow the spring 375 to rotate the arm 363 in the clockwise direction as viewed in FIG. 28, to raise the feed pad 205. Simultaneously, the control cam 300 engages the roller 296 on arm 290 attached to the pivotally mounted feed wheel support plate 280. This pivots plate 280 (to the left was viewed in FIG. 23) to separate the feed wheel 276 from the feed wheel 274, thus terminating the feeding of the strap. The motor 250 continues to run, however.

Downward movement of the anvil 204 is also initiated at 32 degrees of cam shaft rotation. Specifically, control cam 418 passes the roller 416 on the anvil lift cam 406. This permits the anvil shaft 400, under the influence of the spring 420, to move downwardly. The roller 416 on anvil lift cam 406 is forced inwardly against the control cam drum 302 by the spring 420. At 34 degrees of cam shaft rotation, the anvil 204 has been returned to the downwardmost position.

At 35 degrees of cam shaft rotation, feed wheel 276 has been moved to its furthest position away from feed wheel 274.

At 44 degrees of cam shaft rotation, the feed pad 205 has been raised to the maximum elevation as illustrated in FIG. 10.

At 44 degrees of rotation of control cam drum 302 from the reference position, cam 480 (FIGS. 24 and 27) on the end face of control cam drum 302 engages pawl 470. By 79 degrees of cam shaft rotation, the pawl 470 has been moved to the extreme disengaged position (illustrated in dashed lines in FIG. 27) to allow the anvil shaft 400 to rotate in a counterclockwise direction relative to the rocker member 450.

Also at 79 degrees of cam shaft rotation, cam 462 on the end face of control cam drum 302 engages lug 460 on the top rocker guide 456 to rotate the anvil shaft 400 and the anvil 204 mounted thereon so as to move the strap free end off of the elevated feed pad 205 and onto the cavity guide surface 224 as illustrated in FIGS. 10 and 11. FIG. 10 shows the initial position of the anvil and feed pad where the anvil 204 is in its downwardmost position and the feed pad 205 is in the elevated position with the free end of the strap lying on the feed pad 205. In FIG. 11, the anvil 204 has been rotated (by the control cam 462 acting on the bottom rocker guide 464 to rotate the anvil shaft and anvil) so as to bring the strap free end onto the cavity guide surface 224.

Additionally, at 79 degrees of cam shaft rotation, switch cam 331 actuates switch 341 (FIG. 20) to energize the anvil rotating and oscillating motor 252. The eccentric shaft 444 (FIG. 24) is thus rotated within the rocker member 450. As explained in detail above, oscillation of the rocker member 450 by the eccentric shaft 444 intermittently drives, through the rocker member clutch, the shaft 400 (in a clockwise direction as viewed in FIG. 24) to rotate the anvil 204 around the cavity guide surface 224 as illustrated in FIGS. 12–16. Since the strap feed wheel 276 is being held spaced away from the feed wheel 274, the strap may be pulled as necessary by the anvil 204 through the apparatus, from the strap reel 162 while forming the primary strap loop illustrated in FIG. 16.

At 95 degrees of cam shaft rotation, switch cam 331 has passed switch 341 which then resets to de-energize the anvil rotating motor 252. The strap is restrained by the anvil 204 which partially overhangs the front face 230 (FIG. 7B).

At 95 degrees of cam shaft rotation, the cam 380 on the control cam drum 302 begins to engage the feed pad actuation arm roller 367 to pivot the arm 363 (counter-clockwise as viewed in FIG. 28) to move the feed pad 205 toward the lowered position.

Between 79 and 95 degrees of cam shaft rotation, the control cam 480 on the end of control cam drum 302 moves past and clears the pawl 470 (FIG. 27), thus permitting the pawl return spring 478 to urge the pawl 470 against the circumference of the bottom rocker guide 464. However, since the anvil shaft and bottom rocker guide have been rotated to carry the notch 468 past the pawl 470, the pawl does not engage the bottom rocker guide notch 468 until the anvil 204 has been rotated all the way around to the position illustrated in FIG. 16 corresponding to 95 degrees cam shaft rotation.

At 104 degrees of cam shaft rotation, control cam 300 is positioned such that the roller 296 on arm 290 begins to move inwardly towards the control cam drum 302 thus permitting the feed wheel 276 to move inwardly (under the influence of a suitable spring, not illustrated) toward the feed wheel 274 to press the strap S therebetween. At 112 degrees of cam shaft rotation, the feed wheel 276 has completed its movement against the feed wheel 274 in preparation for frictionally engaging the strap S to feed the strap forward to expand the loop.

Also, at 112 degrees of cam shaft rotation, the control cam 380 has fully engaged roller 367 to rotate arm 363 to move the feed pad 205 to the lowermost position.

The motor 250 is still energized and rotating the feed wheel 274 in the strap feeding direction. Consequently, when the feed wheel 276 is moved back against feed wheel 274 with the strap S therebetween, the strap S is immediately fed forward through the apparatus to expand the loop. At this point, the anvil 204 is still positioned to hold the overlapping strap free end on the guide surface 224 as illustrated in FIG. 16.

The strap feeding motor 250 continues to run to feed the strap to enlarge the loop for a predetermined length of time so as to provide an enlarged loop of the desired size. This is determined by the previously discussed off-delay timer (not illustrated) which is suitably connected in the control circuit for motor 250.

It is to be recalled that the off-delay timer contacts are initially closed to energize the motor 250. The timer contact closure was effected through a suitable relay in response to actuation of the switch 343 by the cam 333 at 15 degrees of cam shaft rotation. Now, after the formation of the new primary strap loop, the motor 250 continues to run to enlarge the strap loop while the cam shaft continues to rotate.

At 134 degrees of cam shaft rotation, the cam 333 has passed the switch 343 which then resets. Resetting of the switch 343 also initiates the timing sequence of the off-delay timer. The timing sequence continues to maintain the timer contacts in the motor circuit closed for a pre-set time period. Thus, the energization of the motor 250 continues and the strap loop is further enlarged. At the end of the pre-set time period, the off-delay timer contacts open to de-energize the motor 250 and thus terminate the expansion of the strap loop at the desired size.

Also at 134 degrees of cam shaft rotation, switch cam 332 moves past switch 342 thus resetting switch 342 and de-energizes the cam drive motor 254. The cam drive motor 254 coasts to a stop at 150 degrees of cam shaft rotation. At this point, the cam shaft 304, and the switch cam drum 322 and the control cam drum 302 carried thereon, are at the home position. The enlarged strap loop is ready to receive a new package and the apparatus has the appearance as illustrated in FIG. 7A. In this state, the machine is now ready to begin the next strapping cycle by insertion of the next package into the loop and against the cycle switch (as illustrated in FIGS. 17 and 18).

From the foregoing, it will be observed that numerous variations and modifications may be effected without departing from the true spirit and scope of the novel concept of the invention. It is to be understood that no limitation with respect to the specific apparatus and method illustrated herein is intended or should be inferred. It is, of course, intended to cover by the appended claims all such modifications as fall within the scope of the claims.

What is claimed is:

1. A method of forming a strap loop and securing it about an article comprising:
    (a) pressing a portion of the strap against a guide surface;
    (b) moving said pressed strap portion in a path while pressed against said guide surface to form a loop and feeding the trailing portion of the strap to expand the loop to a predetermined size;
    (c) effecting relative movement between said article and the expanded loop to locate the expanded loop about said article; and
    (d) joining adjacent overlapped portions of the loop to secure said loop around said article.

2. The method in accordance with claim 1 in which step (b) includes the step of first forming a primary strap loop and the subsequent step of restraining said pressed strap portion from further movement while feeding the trailing portion of the strap to expand the primary loop.

3. The method in accordance with claim 1 in which step (a) includes pressing a portion of the strap at a location along the strap that is spaced inwardly of the distal end of the strap.

4. The method in accordance with claim 1 in which step (d) includes joining at least part of said pressed strap portion to an adjacent overlapped portion of the loop.

5. A method of forming a strap loop and securing it about a package comprising:
    (a) pressing a leading portion of a length of strap having first and second strap surfaces on a guide surface with the first strap surface in surface-to-surface contact with said guide surface;
    (b) restraining the strap from twisting, relative to said pressed leading strap portion, along a trailing portion of the strap that is spaced from said leading strap portion;
    (c) moving said leading strap portion while pressed on said guide surface to form a primary strap loop between the leading strap portion and the restrained trailing strap portion;

(d) restraining the leading strap portion from further movement while feeding the length of strap to expand the primary strap loop to a predetermined larger size;

(e) placing the leading strap portion and an adjacent overlapped strap segment of the strap together with the first surface of the leading strap portion in contact with the second surface of the overlapped strap segment;

(f) effecting relative movement between said package and the expanded loop to locate the expanded loop about said package; and (g) joining said leading strap portion and an adjacent overlapped portion of the loop.

6. A method of forming a strap loop and securing it about a package comprising:

(a) providing a guide surface and a length of strap fed from below the guide surface with an end segment extending to said guide surface;

(b) restraining said strap end from twisting along a trailing portion of the strap that is spaced from said strap end segment;

(c) forcing said strap end segment flat against said guide surface;

(d) moving said strap end segment while forced against said guide surface to form a primary strap loop while permitting said primary strap loop to twist off of said guide surface;

(e) terminating the movement of said strap end segment after said primary strap loop has been formed and continuing to force said strap end segment against said guide surface while feeding the strap to expand the loop to a predetermined larger size;

(f) effecting relative movement between said package and the expanded loop to locate the expanded loop about said package; and (g) joining at least part of said strap end segment and an adjacent overlapped portion of the loop.

7. A method of forming a strap loop and securing it about a package comprising:

(a) providing a length of strap having a top surface, a bottom surface, and a free end;

(b) providing a strap guide surface and feeding said strap below the strap guide surface;

(c) forcing a portion of the strap adjacent said free end upwardly to at least the level of said strap guide surface with a lifting member contacting the bottom surface of said strap;

(d) contacting the top surface of said strap with a downwardly biased, rotatable anvil;

(e) rotating said anvil engaged with said strap to move said strap portion from said lifting member onto said guide surface and into a primary loop configuration;

(f) terminating the movement of said anvil after said primary loop has been formed;

(g) continuing to engage said strap with said anvil to restrain the engaged portion of the strap against said guide surface from further movement while continuing to feed the strap to expand the loop to a predetermined larger size;

(h) effecting relative movement between said package and the expanded loop to locate the expanded loop about said package;

(i) tensioning said strap to tighten the loop about said package; and (j) joining at least part of said strap portion and an adjacent overlapped portion of the loop.

8. The method in accordance with claim 7 in which step (b) includes restraining the strap from twisting along a trailing portion of the strap that is spaced from the strap free end.

9. An apparatus for forming and securing a strap loop about a package, said apparatus comprising:

a surface for receiving a strap to be moved thereon;

means for pressing a portion of the strap flat against the surface;

means for moving said pressing means to move said pressed strap portion in a path with the strap portion pressed against said surface to form a primary strap loop with a leading strap portion adjacent a trailing portion of the strap;

means for feeding the trailing portion of the strap to expand the primary loop to a predetermined larger size; and means for joining adjacent overlapped portions of the loop to secure said loop around an article placed in said larger loop.

10. The apparatus in accordance with claim 9 further including means for tensioning said strap to tighten the larger size loop about a package placed therein.

11. The apparatus in accordance with claim 9 in which said pressing means is a rotatable anvil adapted to press said pressed strap portion against said surface.

12. The apparatus in accordance with claim 11 in which said surface defines a circular arc path along which said strap is pressed and moved.

13. The apparatus in accordance with claim 9 in which said pressing means comprises: an anvil adapted to press said strap portion against said surface, in which said moving means comprises an anvil shaft extending through said surface generally normal to the surface, said anvil mounted on said anvil shaft above said surface; spring means biasing said anvil shaft downwardly to force said anvil towards said surface; a rocker member drivably connected to said anvil shaft through a one-way clutch, said rocker member defining an opening on one end; and a motor driven eccentric shaft means received in said rocker member opening for eccentrically rotating within said opening and against said rocker member to oscillate said rocker member whereby said anvil shaft and anvil are incrementally rotated in one direction during each alternate half cycle of oscillation of said rocker member when said clutch is engaged.

14. The apparatus in accordance with claim 13 in which said means for joining adjacent overlapped portions of the loop includes means for friction-fusion welding the overlapped portions of the loop, said welding means including:

a pawl pivotably mounted to said rocker member and spring biased to engage said anvil shaft for locking said anvil shaft and said rocker member together in the direction of rotation in which said clutch is disengaged, thereby causing said anvil shaft and said anvil attached thereto to oscillate when said eccentric shaft means is rotated within said rocker member opening, and means for pivoting said pawl out of engagement with said anvil shaft whereby the rotation of said eccentric shaft means in said opening of said rocker member causes said incremental rotation of said anvil shaft and anvil.

15. The apparatus in accordance with claim 9 in which said surface, said pressing means, said means for moving said pressing means, and said feeding means are arranged to form said primary strap loop in a plane at an angle to said surface; and in which said apparatus further includes means for engaging a portion of said strap in said expanded larger size loop if said larger size loop falls sideways toward said surface.

16. The apparatus in accordance with claim 15 in which said engaging means includes two spaced-apart ribs between which a portion of said strap in said expanded larger size loop may extend.

17. An apparatus for feeding and securing a strap loop about a package, said apparatus comprising:

an article receiving table defining a strap guide surface therein;

a feed pad adjacent said strap guide surface movable between a lowered position and a position raised to at least the elevation of said strap guide surface;

means for feeding a length of strap at least over said feed pad;

means for raising said feed pad beneath said strap to force a portion of the strap upwardly to at least the elevation of said strap guide surface;

a rotatable anvil adapted to rotate above said guide surface for at least a portion of one complete revolution;

means for raising said anvil above said guide surface and for also biasing said anvil downwardly into the strap supported by said elevated feed pad;

means for rotating said anvil against said strap to move said strap from said elevated feed pad onto said guide surface and into a primary loop configuration;

control means for terminating the rotating movement of said anvil with a portion of said anvil overhanging said strap guide surface and for controlling said strap feeding means to effect the further feeding of said strap to enlarge said primary loop to a predetermind larger size loop having a first portion of the strap overlying a second portion of the strap;

a vertically reciprocable weld pad disposed adjacent said strap guide surface and adapted to be moved between a lowered position and an elevated position;

means for moving said weld pad to said elevated position thereby pressing said first and second strap portions between said weld pad and the overhanging portion of said anvil;

means for severing the trailing portion of the strap from the loop; and means for oscillating said anvil with said strap portions pressed between said anvil and said weld pad, after said article has been inserted in said larger loop, to form a friction-fusion weld in said larger loop.

18. The apparatus in accordance with claim 17 further including means for withdrawing the trailing portion of the strap, after the article has been inserted in said larger loop, to thereby tension the loop about the article.

* * * * *